United States Patent [19]
Allen et al.

[11] 3,732,671
[45] May 15, 1973

[54] ELECTRIC DRIVE RIDING MOWER

[75] Inventors: David Thomas Allen, Horicon, Wis.; David Linley Apple, Coal Valley, Ill.

[73] Assignee: Deere & Company, Moline, Ill.

[22] Filed: Aug. 31, 1971

[21] Appl. No.: 176,603

[52] U.S. Cl. ............ 56/10.2, 56/DIG. 15, 340/267 R
[51] Int. Cl. ........................................... A01d 69/04
[58] Field of Search .................... 56/10.2, 10.3, 10.6, 56/10.7, 11.3, 11.4, 11.5, 13.5, 16.9, DIG. 15; 340/267 R

[56] References Cited

UNITED STATES PATENTS

| | | |
|---|---|---|
| 3,229,452 | 1/1966 | Hasenbank............................56/11.3 |
| 3,581,480 | 6/1971 | O'Connor et al.....................56/11.9 |
| 2,597,735 | 5/1952 | Jepson................................56/11.9 |
| 2,417,613 | 3/1947 | Radabaugh..........................56/11.9 |
| 2,959,174 | 11/1960 | Anderson .......................56/DIG. 15 |
| 3,169,358 | 2/1965 | Ertsgaard et al................56/DIG. 15 |
| 3,608,285 | 9/1971 | Berk....................................56/10.2 |

*Primary Examiner*—Antonio F. Guida
*Attorney*—H. Vincent Harsha, et al.

[57] ABSTRACT

An electric drive riding mower has a mobile main frame mounted on a pair of rearward drive wheels and steerable front wheels and a rotary mower unit suspended from the main frame between the front and rear wheels. The drive wheels are driven by a direct current motor through a belt drive and a change speed mechanical transmission, and the mower unit includes a pair of rotary blades respectively driven and directly connected to a pair of direct current motors. The traction and mower motors are connectible to a series of batteries carried on the main frame through an electric control system, which includes a main switch and a mower switch actuatable by the operator for controlling relays, which control the connection of the motors to the battery.

26 Claims, 3 Drawing Figures

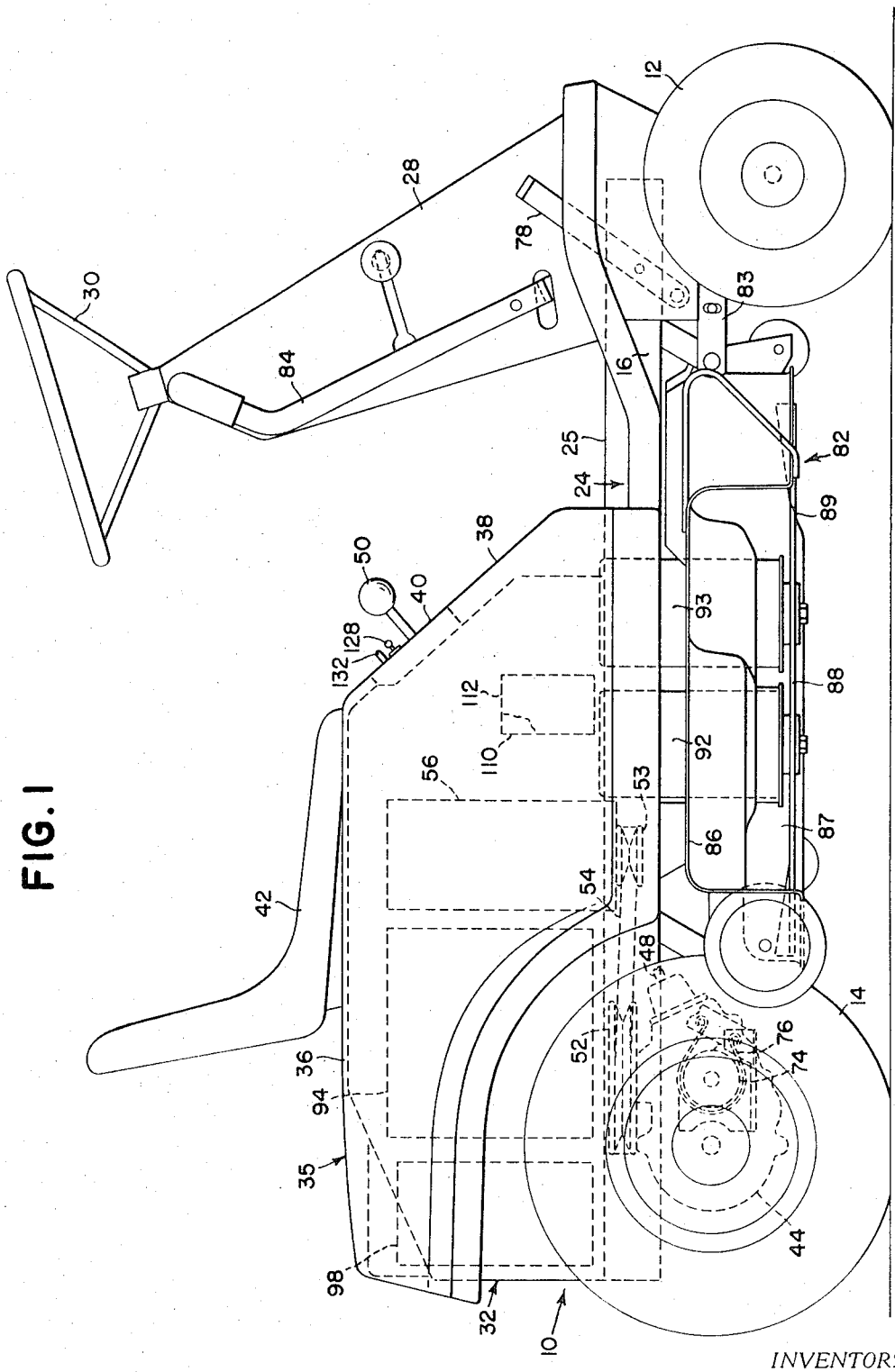

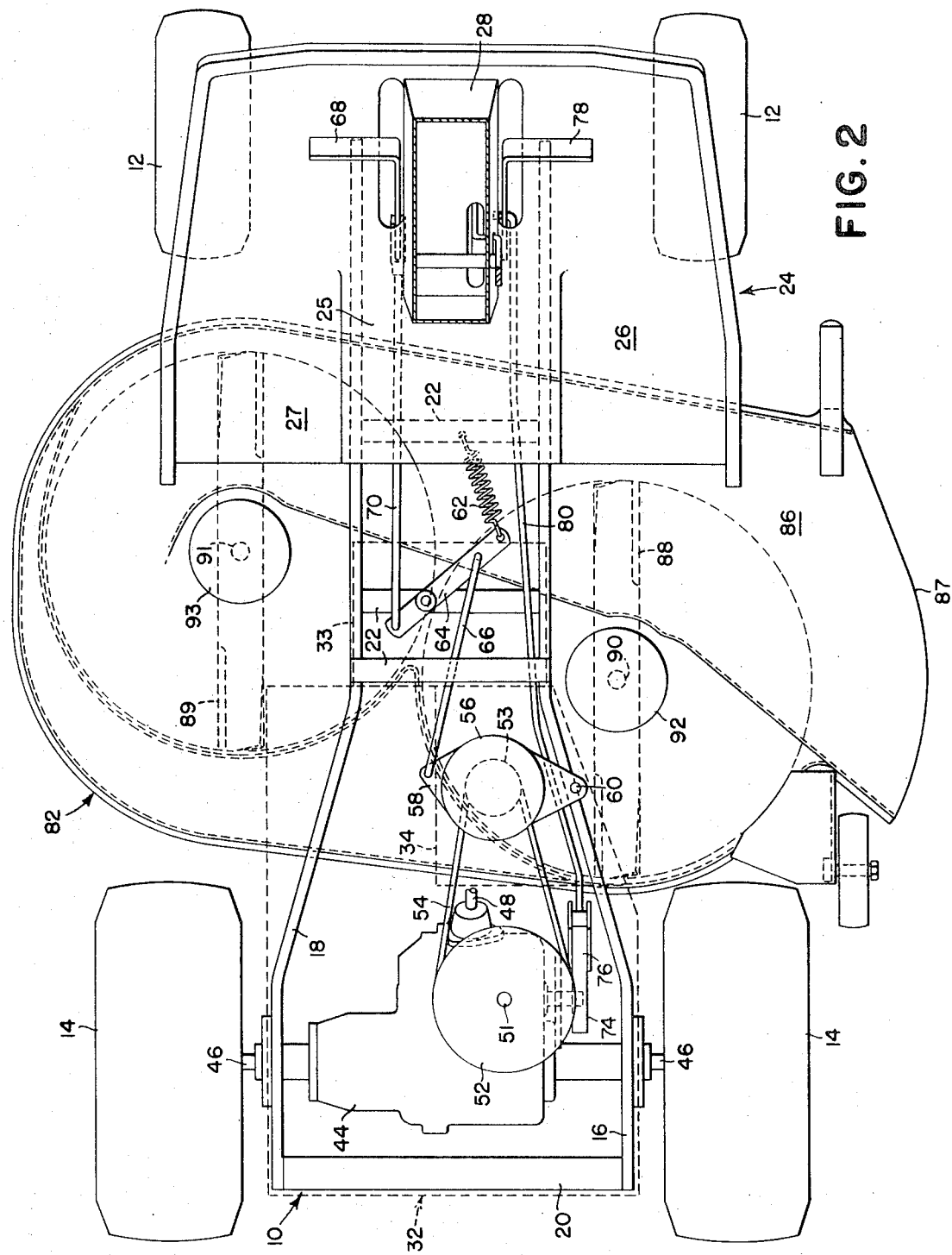

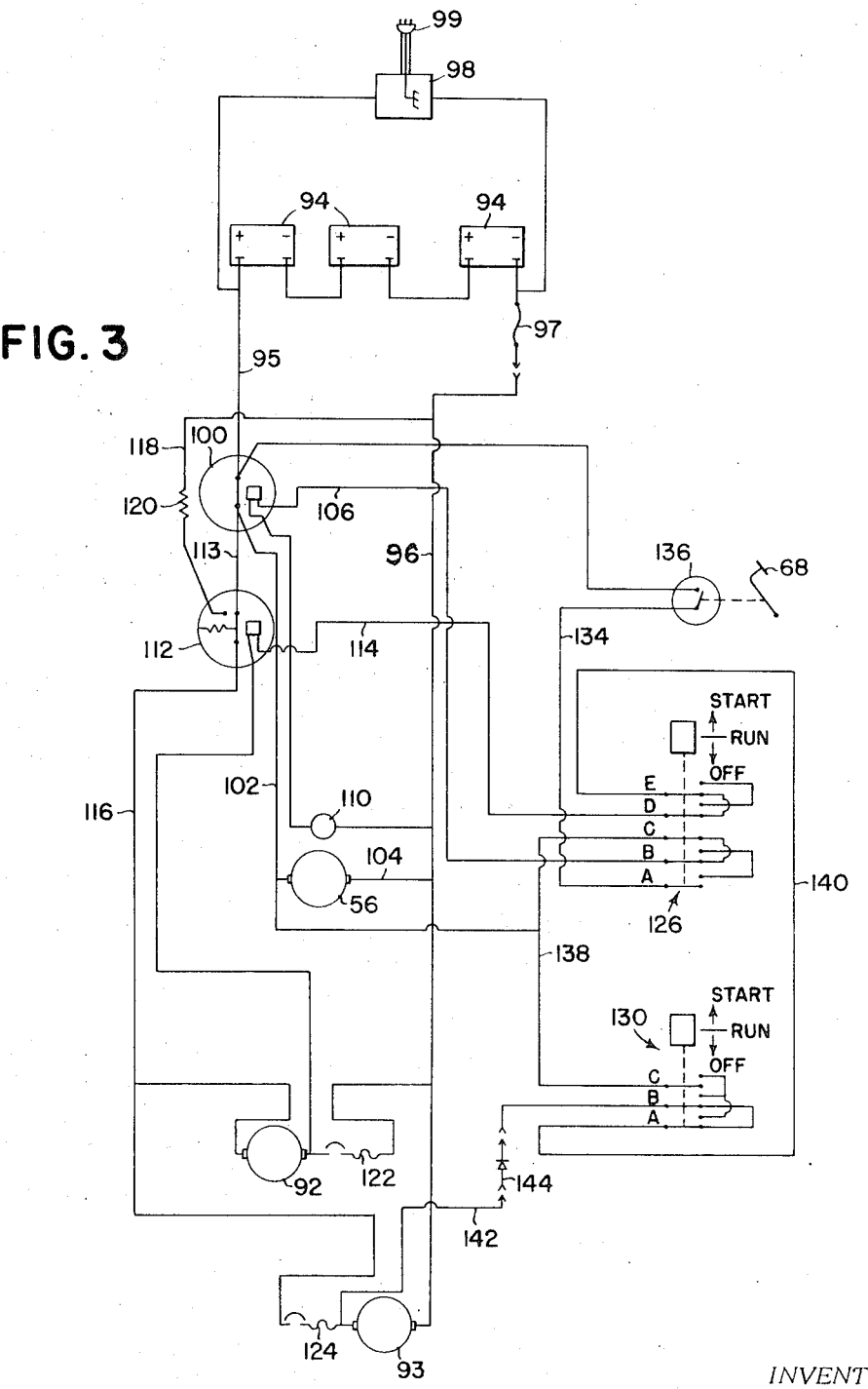

ELECTRIC DRIVE RIDING MOWER

BACKGROUND OF THE INVENTION

This invention relates to an electric drive tractor-mower, and more particularly to a battery powered riding mower having separate electric motors for propelling the vehicle and driving the mower.

In recent years, a relatively large market has developed for lawn and garden type tractors, which are chiefly used for light duty lawn maintenance and snow removal. More recently, many manufacturers have produced a smaller, lower powered unit, known as a riding mower, which is normally used only for mowing lawns, although some units of this type are provided with light-duty snow removal equipment.

Heretofore, the lawn and garden tractors and riding mowers have conventionally utilized small internal-combustion engines. However, the internal-combustion engines create a noise and air pollution problem, which has become quite critical, particularly regarding the noise pollution, since the equipment is often used in residential areas. There are already relatively stringent requirements regarding noise pollution in some residential areas and more regulations are expected. Also, the use of internal-combustion engines has resulted in the inconvenience and hazard of obtaining and storing the necessary fuel, as well as the inconvenience of servicing the engine.

To overcome the problems associated with an internal-combustion engine, a battery powered lawn and garden tractor has recently been introduced, although the machine now available is a relatively large, expensive lawn and garden tractor, unsuited for many applications where a smaller, less expensive machine is desired.

SUMMARY OF THE INVENTION

According to the present invention, there is provided an electrically driven tractor-mower having a novel electric drive system for both the mower unit and the traction unit. Also according to the invention, the tractor-mower unit is provided with a novel and compact arrangement of components, so that the machine is relatively inexpensive and easy to operate, and further is very maneuverable and has good weight distribution for easy steering and good traction.

More specifically, the tractor-mower is arranged with the mower unit suspended between the steerable front wheels and the rear drive wheels of the machine, the weight of the operator and the weight of most of the electrical components, such as the battery charger, batteries, and the electric traction motor, being chiefly carried by the rear drive wheels.

An important feature of the invention resides in the novel electrical system, which utilizes separate electric motors for driving the drive wheels and the mower unit from the same electric power source. Also according to the invention, a novel control system is provided for controlling the traction and mower motors, which controls provide for a simple and safe operation of the unit. More specifically, the controls include a main switch, which controls the traction motor, and a mower switch, which controls the mower drive motors, the traction and mower motors also being provided with overload protection. Still more specifically, the control system provides for stopping of the mower as a result of turning off the main switch, turning off the mower switch, an overload on the traction motor, or an overload on the mower motor. Also according to the invention, if the traction motor is overloaded, the entire machine becomes inoperative.

Another feature of the invention resides in the provision of a pair of mower motors with separate overload protection for each motor, wherein both motors will stop when either motor becomes overloaded. Also, when the mower motors' circuit breakers open, the motors will not restart when the circuit breakers close until the operator intentionally starts them. Also, the traction motor will not start accidentally after an overload has been experienced until the operator intentionally starts the machine.

Still another feature of the control system resides in the fact that the mower motors cannot be started unless the main switch is turned on. Also, means are provided on the mower motors for stopping the motors in a relatively short period after the power supply is disconnected from the mower motors.

Still another feature of the invention resides in the provision of a clutch for disconnecting the traction motor from the drive wheels. Also, the control system includes a switch actuatable by the clutch so that the traction motor cannot be started unless the clutch is disengaged.

Still another feature of the invention resides in the provision of a reversible, change speed transmission between the traction motor and the drive wheels, to provide for different forward speeds and a reverse even though a constant speed traction motor is utilized.

BRIEF DESCRIPTION OF THE DRAWINGS

FIG. 1 is a side elevation view of the tractor-mower unit, with some of the electrical components schematically shown in dashed lines.

FIG. 2 is a plan view of the tractor-mower unit with the hood and some of the other upper components removed to show the drive components.

FIG. 3 is a schematic illustration of the electric drive system shown in an operating condition with the traction and mower motors running.

DESCRIPTION OF THE PREFERRED EMBODIMENT

The invention is embodied in a riding mower having a mobile main frame, indicated in its entirety by the numeral 10, which is mounted on a pair of steerable front wheels 12 and a pair of rear drive wheels 14. The main frame includes a pair of fore-and-aft extending frame members 16 and 18, the forward portions of which are parallel and relatively closely spaced, while the rearward portions diverge and are disposed immediately inside the rear wheels. The frame members are rigidly interconnected by a rear frame member 20 and a number of intermediate transversely extending members 22.

A generally horizontal deck 24 is supported on the front portion of the frame members 16 and 18 and partly extends over the front wheels 12. The deck has a raised central area 25, spanning the frame members 16 and 18, and right and left foot receiving depressed areas 26 and 27 on opposite sides of the central area, the forward ends of the depressed areas being inclined upwardly to the level of the central area 25.

A steering column 28 extends upwardly from the forward end of the central area of the deck 24 and is inclined slightly to the rear. A steering wheel 30 is supported at the top of the steering column 28 and controls the steerable front wheels 12 through a conventional steering mechanism. All of the above represents more or less conventional construction for a riding mower.

A box-like structure, indicated in its entirety by the numeral 32, is supported on top of the frame members 16 and 18 between the drive wheels and extends approximately from the middle of the machine to the rear frame member 20. The structure 32 is shown in outline only in FIG. 2 with dashed lines and is chiefly shown with hidden lines in FIG. 1. As is apparent from FIG. 2, the rearward part of the structure is substantially as wide as the space between the rearward parts of the frame members 16 and 18 and has a motor compartment 34 also shown in dashed lines. The right wall of the structure tapers inwardly and forwardly at the motor compartment to clear the right mower motor. The structure also includes a control compartment 33 at its forward end, which has the same width as the space between the forward portions of the frame members. The remainder of the structure 32 forms a battery compartment.

As shown in FIG. 1, the structure 32 is covered with a hood 35, which has a flat top surface 36 and a downwardly and forwardly inclined front wall 38, which is provided with an opening for an instrument panel 40, which is attached to the box-like structure 32. The hood is raisable to expose the various compartments of the structure 32 and the electrical components therein. The forward end of the hood extends to the rear of the deck 24 and is the same width as the deck, thereby covering the mower motors. An operator's seat 42 is mounted on the top surface of the hood, and, as is apparent from FIG. 1, the seated operator straddles the steering wheel with his feet resting in the depressed areas 26 and 27 of the deck.

A combination transmission and drive axle 44, commonly referred to as a transaxle, is supported on the main frame between the rear drive wheels 14 and has a pair of drive axles 46 respectively connected to the opposite wheels 14. The transaxle is shiftable from a neutral condition into three forward speed ranges and one reverse range through a shift lever 48 extending forwardly from the transaxle. The lever 48 is connected to a shift handle 50 on the instrument panel 40 through a suitable linkage to permit the seated operator to vary the gear ratio and direction of travel.

The transaxle has a vertical input shaft 51 to which is secured a V-belt pulley 52, which is connected to and driven by a drive pulley 53 by a V-belt 54. The drive pulley is attached to the shaft of a direct current, permanent magnet, vertically oriented motor 56, which is mounted in the motor compartment 32 on a motor support 58 mounted on a vertical pivot 60 for swinging in a fore-and-aft direction. As is apparent, when the mower support is swung forwardly, it applies tension to the V-belt 54, while swinging of the motor to the rear relieves the belt tension to declutch the motor from the transaxle 44. The motor support is biased forwardly into its engaged position by a clutch spring 62 connected to one end of an arm 64 swingably mounted on the main frame 10, the same end of the arm being connected to the motor support 58 by a link 66, so that the spring normally supplies the necessary drive tension for the V-belt. The belt drive is declutched by depressing a clutch pedal 68 pivotally mounted on the left side of the steering column 28 and connected to the other end of the arm 64 via a link 70, so that depression of the clutch pedal 68 against the bias of the spring 62 causes the motor support to shift rearwardly, thereby relieving the tension on the belt 64.

The output of the transaxle 44 is connected to an axially transverse brake pulley 74 disposed on the right side of the transaxle. The pulley 74 is engageable by a band-type brake 76 actuated by a brake pedal 78 pivotally mounted on the right side of the steering column and connected to the brake 76 through a suitable linkage 80, so that depression of the brake pedal tightens the brake band around the pulley 74 to brake the transaxle output.

A rotary mower unit 82 is suspended from the under side of the main frame 10 between the front and rear wheels 12 and 14 by means of a conventional suspension mechanism, which includes a linkage 83 at the forward end of the mower unit. The suspension mechanism also includes an adjustable cable (not shown) for raising and lowering the mower unit and the end of the cable is connected to a control lever 84 mounted on the right side of the steering column 28, the height of the mowing unit being controlled by adjusting the control lever in a fore-and-aft direction. The mower unit has a generally horizontal housing 86, which has depending side walls with an open bottom and a discharge opening 87 on the right side of the housing. The mower unit includes a pair of spaced horizontal blades 88 and 89 respectively mounted on vertical shafts 90 and 91 journaled in and extending upwardly through the mower housing, the blades rotating in a clockwise direction as viewed in FIG. 2 to cut the grass as the machine advances and discharge it to the right through the discharge opening 87. All the above represents more or less conventional design for such suspended mower units.

The individual mower blades 88 and 89 are respectively driven by direct current permanent magnet motors 92 and 93 mounted on top of and extending upwardly from the housing 86 coaxially with the respective blades, the motor shafts being directly connected to the shafts 90 and 91. The upper ends of the mowers 92 and 93 are disposed on opposite sides of the main frame outwardly of the structure 32, although the hood 35 does overlie the motors 92 and 93.

The traction motor 56 and the mower motors 92 and 93 are part of the electric drive system, which is schematically illustrated in FIG. 3. The drive system is a direct current system and includes three series-connected lead-acid batteries 94, which are mounted in the rear box-like structure 32 above the transaxle 44 and below the seat 42, as schematically illustrated in FIG. 1. The batteries are connected to a positive lead 95 and a ground lead 96, which includes a conventional fuse 97. A battery charger 98 is also mounted within the structure 32 and has a cord 99, which plugs into a conventional 110 volt power source to charge the battery when the machine is not in use.

The control circuit includes a main relay or solenoid switch 100 connected to the positive lead 95 and closable to connect the positive lead 95 to the positive lead 102 of the traction motor 56, which has a negative lead 104 connected to the ground lead 96. The main relay 100 is closed, as illustrated, in response to current in a main relay energizing line 106, having a thermostatically controlled switch 110, which opens when the temperature of the motor 56 exceeds a predetermined value to de-energize the main relay 100 and therefore disconnect the motor 56 from the power source.

A mower relay or solenoid switch 112 is connected to the lead 102 via a lead 113 and is closed in response to current in an energizing line 114 to connect the lead 113 to an output lead 116 to which the motors 92 and 93 are connected in parallel. The mower relay 112 is biased toward an open condition, wherein it connects the output lead 116 to a lead 118 connected to the ground 96 and having a resistor 120, so that when the mower relay is deenergized, and the mower motors are turning to function as generators, they are connected to the ground through the resistor 120, which loads the motors to a sufficient degree that they will stop within three seconds after the mower relay is opened.

The right mower motor 92 is connected to the ground through a circuit breaker 122, while the left mower motor 93 is directly connected to the ground but has a circuit breaker 124 on its positive side.

The control circuit includes a main, manually actuated, three-position switch 126, which, in the illustrated embodiment, is operated by a key 128 on the instrument panel 40. The switch is shiftable from a "run" position, wherein it is shown in FIG. 3, downwardly to an "off" position or upwardly to a "start" position. Also mounted on the instrument panel 40 is a three-position manually actuated mower switch 130, which is actuated by a lever 132. The switch 130 is also shiftable from a "run" position, wherein it is illustrated in FIG. 3, downwardly to an "off" position or upwardly to a "start" position.

The main switch has five terminals, labeled "A" through "E," and the mower switch has three terminals, labeled "A," "B," and "C." The "A" terminal of the main switch is connected to the positive lead 95 of the batteries via a circuit 134 having an on-off switch 136 actuated by the clutch pedal 68, the switch being open when the clutch is engaged and closed only when the clutch pedal is depressed. The "B" terminal of the main switch is connected to the main relay energizing line 106, while the "C" terminal is connected to the "C" terminal of the mower switch by a lead 138 also connected to the positive lead 102 of the traction motor 56. The "D" terminal is connected to the energizing line 114 of the mower relay, and the "E" terminal is connected to the "A" terminal of the mower switch by a lead 140. The "B" terminal of the mower switch is connected to a positive side of the mower motor 93 between the breaker 124 and the mower 93 via a lead 142, which includes a latch diode 144 operative to permit the flow of current only from the input side of the mower motor to the "B" terminal of the switch. As schematically shown in FIG. 1, the relays 100 and 112 are mounted in the control compartment 33 of the structure 32 immediately behind the instrument panel 40.

In operation, when the switches 126 and 130 are in their off position, all of their terminals are disconnected, and the relays 100 and 112 are therefore deenergized and open, so that the positive lead 95 from the batteries 94 is disconnected from the entire control circuit. Since the main relay 100 is interposed between the mower relay 112 and the power source, power cannot be supplied to the mower motors 92 and 93 unless the main relay is closed, so that actuation of the mower switch 130, either by accident or by a child playing with the machine, will not start the mower motors unless the main relay is closed, which is controlled by the key actuated main switch 126. When the main relay 100 is open, only the lead 134 is connected to the positive lead 95 from the batteries, and since terminal "A" of the main switch, which is connected to the lead 134, is open in both the "off" position and the "run" position, as illustrated in FIG. 3, nothing will happen until the main switch is shifted to the "start" position, to connect terminal "A" to terminal "B." Even then, nothing will happen unless the clutch pedal 68 is depressed to disengage the clutch and close the switch 136, and therefore to start the system, the operator must disengage the clutch and turn the key 128 to the "start" position, thereby completing the main relay energizing circuit, causing the main relay 100 to close. The closed relay connects the lead 102 and consequently the traction motor 56 to the power source.

The lead 102 is also connected to terminal "C" of both switches via the lead 138. Since the main switch 126 is spring biased from the "start" position to the "run" position, as is conventional, when the key is released, the switch will return to the "run" condition as illustrated in FIG. 3, connecting the now positive terminal "C" to terminal "B," to keep the main relay energizing circuit connected to the power source. Once the main switch is returned to the "run" position, the power is no longer supplied to the energizing circuit through the lead 134, so that the operator can engage the clutch and allow the clutch switch 126 to open without de-energizing the main relay.

Once the main relay 100 is closed, the power source is connected to the mower relay 112 via the lead 113. Since terminal "C" of the mower switch 130 is the only terminal connected to the power source when the mower relay is open and is disconnected from the other switch terminals in both the "run" and "off" positions, the mower relay cannot be energized until the mower switch 130 is moved to its "start" position, wherein it connects terminals "A," "B" and "C." The diode 144 prevents the flow of current from terminal "B" to the motor 93 via the lead 142, so that the current flows from the traction motor positive lead 102, through the lead 138, through connected terminals "C" and "A" in the mower switch, and to the lead 140 connected to terminal "E" of the main switch 126, and since terminal "E" is connected to terminal "D" in either the "start" or "run" positions of the main switch, the power flows to the energizing line 114 for the relay 112, the energizing line 114 being grounded through the circuit breaker 122 in the motor 92. The energized relay 112 then closes to connect both the mower motors 92 and 93 to the power source in parallel via the lead 116.

The mower switch 130 is biased from its "start" toward its "run" position, so that when the switch lever 132 is released, the switch will return to its "run" position, as shown in FIG. 3, wherein only terminals "A" and "B" are connected. The power for energizing the mower relay then flows from the motor input lead 116, through the circuit breaker 124, through the diode 144, and through the connected terminals "A" and "B," and then, as described above, through the lead 140 and the connected terminals "D" and "E" of the main switch to the relay energizing line 114, and then to ground through the circuit breaker 122. Since both the circuit breaker 122 for the motor 92 and the circuit breaker 124 for the motor 93 are included in the relay energizing circuit, the relay will be de-energized and opened when either of the circuit breakers 122 or 124 opens as the result of an overload in either of the mower motors.

When the energizing circuit of the relay 112 is open, either as a result of turning the switch 130 to the "off" position or the opening of either of the circuit breakers 122 or 124, the spring loaded relay 112 will shift to its open position, wherein it connects the motor input lead 116 to the ground lead 118 through the resistor 120, so that the rotating motors 92 and 93 function as generators and are loaded by the resistor 120, which stops the motors within 3 seconds.

If the traction motor becomes overheated, due to an overload, the switch 110 will open to interrupt the energizing circuit for the main relay 100, which of course, disconnects the power source from all the motors. Once the mower relay opens, it cannot be closed again until the operator intentionally moves the switch to its "start" position. Thus, if the relay is opened as a result of the opening of either of the circuit breakers 122 or 124, the relay will not close when the circuit breakers close, even if the operator leaves the switch in the "run" position. Similarly, if the main relay 100 is opened as a result of the thermostat switch 110 opening, the main relay will remain open after the switch 110 closes again, even if the main switch is left in its "run" position, since, the operator must again intentionally go through the "start" cycle to again close the main relay. As is apparent, the control circuit is not very complex and is relatively simple to operate, although it has many safeguards as to overloads and accidental starting of both the mower motors and the main traction motors.

We claim:

1. An electric drive tractor-mower unit comprising: a mobile main frame mounted on a pair of rear drive wheels and steerable front wheels; a mower unit including a generally horizontal housing suspended from the main frame between the front and rear wheels and at least two rotary cutting blades; at least two D. C. motors mounted on the top of the housing and having vertical shafts respectively extending downwardly through the housing and coaxially and drivingly connected to the respective blades; a pair of drive axles respectively connected to the drive wheels; a battery compartment on the main frame generally above the drive axle and substantially enclosing battery means; a D. C. traction motor supported on the main frame forwardly of the battery compartment; drive means connecting the traction motor to the drive axles; and operator seat mounted on the main frame generally above the traction motor and battery compartment; and electric control circuit means for controlling the connection of the traction and mower motors to the battery means.

2. The invention defined in claim 1 wherein the main frame includes a generally horizontal deck above the mower housing and forwardly of the seat for supporting the feet of an operator sitting on the seat and having a rearward edge forwardly of the mower motors, the mower motors extending above the level of the deck on opposite sides of the main frame, the main frame also including a steering column extending upwardly from a central portion of the forward end of the deck and supporting a steering mechanism actuatable by an operator sitting on the seat.

3. The invention defined in claim 1 wherein the traction motor has a vertical output shaft, and the drive means includes a change speed transmission directly connected to the drive axles and disposed between the drive wheels below the battery compartment with a vertical input shaft, and a belt drive including a drive pulley mounted on the traction motor output shaft and a driven pulley mounted on the transmission input shaft.

4. An electric drive riding mower comprising: a mobile main frame mounted on a pair of rear drive wheels and steerable front wheels and including a box-like structure on a rearward portion of the main frame, an operator's seat on top of said structure, a deck forwardly of the box-like structure and adapted to support the feet of an operator sitting on the seat, and a steering column extending upwardly from the forward end of the deck and supporting a manually actuatable steering element controllable by a seated operator, a battery means disposed within the box-like structure; a mower means suspended from the main frame between the front and rear wheels; a D. C. motor means; means operatively connecting the motor means to the mower means and the drive wheels; and an electric circuit means actuatable by the operator and operative to connect the battery means to the motor means.

5. The invention defined in claim 4 wherein the means connecting the motor means to the drive wheels includes a change speed transmission having a shift lever actuatable from the operator's seat, and a clutch means, including a clutch pedal disposed adjacent to the steering column.

6. The invention defined in claim 4 wherein the motor means includes a D. C. traction motor mounted within the box-like structure, and at least one D. C. mower motor mounted on the mower means.

7. An electric drive tractor mower comprising: a mobile main frame at least partly supported on drive wheel means; a DC power source on the main frame; a DC traction motor; a drive means connecting the traction motor to the drive wheel means; a mower means carried by the main frame; at least one DC mower motor drivingly connected to the mower means; and an electric control circuit means for connecting the traction motor and the mower motor to the power source and including a main manually actuatable switch shiftable into at least first and second positions, a main relay energized when the main switch is shifted to its first position and operative to connect the traction motor to the power source when it is energized; a temperature sensitive switch means operative to automatically open when the temperature of the traction motor exceeds a predetermined value and interrupt the energizing of the main relay and thereby disconnect the traction motor from the power source, and a manually actuatable mower switch shiftable to at least a first position wherein it causes connection of the mower motor to the power source only when the main relay is energized and a second position wherein it disconnects the mower motor from the power source.

8. An electric drive tractor mower comprising: a mobile main frame at least partly supported on drive wheel means; a DC power source on the main frame; a DC traction motor; a drive means connecting the traction motor to the drive wheel means; a mower means carried by the main frame; at least one DC mower motor drivingly connected to the mower means; and an electric control circuit means for connecting the traction motor and the mower motor to the power source and including a main manually actuatable switch shiftable between first, second and third positions, a main relay, said relay being initially energized only when the main switch is shifted from its first position to its third position and operative to connect the power source to the traction motor when it is energized, the main relay being de-energized when the main switch is shifted to its second position and energized when the main switch is shifted from its third to its first position, and a manually actuatable mower switch shiftable into a first position wherein it causes the connection of the mower motor to the power source when the main relay is energized and a second position where it disconnects the mower motor from the power source.

9. The invention defined in claim 8 wherein the drive means includes a clutch means operatively engageable and disengageable to respectively connect or disconnect the traction motor and drive wheel means.

10. An electric drive tractor mower comprising: a mobile main frame at least partly supported on drive wheel means; a DC power source on the main frame; a DC traction motor; a drive means connecting the traction motor to the drive wheel means and including a clutch means selectively engageable and disengageable to connect or disconnect the traction motor and the drive wheel means; a mower means carried by the main frame; at least one DC mower motor drivingly connected to the mower means; and an electric control circuit means for connecting the traction motor and the mower motor to the power source and including a main relay operative to connect the traction motor to the power source when energized and to disconnect the power source and traction motor when de-energized, a clutch switch shiftable between first and second positions, respectively, in response to engagement and disengagement of the clutch means, a main manually actuatable switch shiftable into a first position wherein it is operative to energize the main relay only when the clutch switch is in its second position and a second position wherein it de-energizes the main relay, and a manually actuatable mower switch operative to connect the mower motor to the power source.

11. The invention defined in claim 10 wherein the electric control circuit means includes a mower relay operative to connect the mower motor to the power source when it is energized and to disconnect the mower motor and power source when it is de-energized, and the mower switch is operatively connected to the main relay and shiftable between a first position wherein it is operative to energize the mower relay only when the main relay is energized and a second position wherein it causes the de-energization of the mower relay.

12. An electric drive tractor mower comprising: a mobile main frame at least partly supported on drive wheel means; a DC power source on the main frame; at least one DC traction motor; a drive means connecting the traction motor to the drive wheel means; a mower means carried by the main frame; at least one DC mower motor drivingly connected to the mower means; and an electric control system means for connecting the traction motor and the mower motor to the power source and including a mower relay operative to connect the mower motor to the power source only when the relay is energized, a manually actuatable mower switch in the energizing circuit of the mower relay, a circuit breaker means operatively associated with the mower motor for opening when the current in the mower motor exceeds a predetermined value and disposed in the energizing circuit of the mower relay to cause the relay to open in response to an overload in the mower motor, a main relay operative to connect the traction motor to the power source when energized, and a main manually actuatable switch, shiftable between first and second positions wherein it respectively causes the energization or the de-energization of the main relay.

13. The invention defined in claim 12 wherein at least two mower motors are provided and a circuit breaker means is provided for each mower motor, each circuit breaker means being included in the energizing circuit of the mower relay, so that the mower relay is opened to disconnect the mower motor from the power source when any of said circuit breakers open.

14. The invention defined in claim 12 and including a temperature sensitive switch means responsive to the temperature in the traction motor and disposed in the main relay energizing circuit to open the main relay when the motor temperature exceeds a predetermined value.

15. An electric drive tractor mower comprising: a mobile main frame at least partly supported on drive wheel means; a DC power source on the main frame; a DC traction motor; a drive means connecting the traction motor to the drive wheel means; a mower means carried by the main frame; at least two mower motors drivingly connected to the mower means and respectively having circuit breaker means which will open when the current in the associated motor exceeds a predetermined value; and an electric control circuit means for connecting the traction motor and the mower motor to the power source and including a main relay operative to connect the traction motor to the power source when the relay is closed, a main manually actuatable switch means operative to control the energization of the main relay, a mower relay operative to connect the mower motors to the power source when the mower relay is energized, the circuit breaker means for the mower motors each being included in the energizing circuit for the mower relay so that the mower relay is opened to disconnect the mower motor from the power source when any of said circuit breakers open, and a manually actuatable mower switch also disposed in the energizing circuit of the mower relay.

16. The invention defined in claim 15 wherein the main relay is also disposed in the energizing circuit for the mower relay, so that the mower relay is de-energized when the main relay is opened.

17. An electric drive riding mower comprising: a mobile main frame at least partly supported on drive wheel means; an operator's station on the main frame; a DC power source carried by the main frame; a DC traction motor; a drive means connecting the traction motor to the drive wheel means and including a change-speed transmission shiftable into different conditions to establish different driving directions and speeds, a belt drive operative between the traction motor and the transmission, and a clutch means selectively actuatable from the operator's station and operatively associated with the belt drive for selectively disengaging the belt drive between the traction motor and the transmission; a mower means carried by the main frame; at least one DC mower motor drivingly connected to the mower means; and an electric control circuit means including switch means manually actuatable from the operator's station for controlling the connection of the traction and mower motors to the power source.

18. The invention defined in claim 17 wherein the traction motor has a vertical drive shaft and the belt drive includes a drive pulley on the drive shaft, a driven pulley connected to the transmission and a drive belt, the motor being mounted on a swingable support for swinging in a generally fore-and-aft direction about a vertical pivot to vary the distance between the pulleys, and the clutch means includes means for adjusting the support between a forward engaged position wherein it maintains the pulleys a sufficient distance apart to provide a drive tension in the belt and a rearward disengaged position, wherein the drive tension is removed from the belt.

19. An electric drive riding mower comprising: a mobile main frame at least partly supported on drive wheel means; an operator's station on the main frame; a DC power source carried by the main frame; a DC traction motor; a drive means connecting the traction motor to the drive wheel means and including a clutch means selectively actuatable from the operator's station and operative to selectively connect or disconnect the traction motor and the drive wheel means; a mower means carried by the main frame; at least one DC mower motor drivingly connected to the mower means; and an electric control circuit means including a main relay adapted to connect the traction motor to the power source when it is energized, a clutch switch operatively associated with the clutch means so that the switch is open when the clutch is engaged, a main control switch means manually actuatable from the operator's station and shiftable into a start position which alone permits the initial energization of the main relay, the clutch switch being disposed in the main relay energizing circuit when the switch means is in its start position to prevent the initial energizing of the main relay and thereby the starting of the traction motor when the clutch is engaged, and a mower switch means operative to control the connection of the mower motor to the power source.

20. In a riding mower having a mobile main frame partly supported on a pair of drive wheels including a mower means carried by the main frame, the combination therewith of an electric drive system for driving the mower unit and the drive wheels and comprising: a battery means carried by the main frame; a DC traction motor; means drivingly connecting the traction motor to the drive wheels; at least two mower motors operative to drive the mower means; a circuit breaker operatively associated with each mower motor for disconnecting the motor from the battery when the current through the motor exceeds a predetermined value; a main relay operatively connecting the battery to the traction motor when it is energized; a first circuit means including the battery and a first manually actuatable switch for controlling the energization of the main relay; a mower relay operatively connecting the battery to the mower motors when said relay is energized; and a second circuit means including the battery, a second manually actuatable switch, and said circuit breakers in series for controlling the energization of the mower relay so that the mower relay is de-energized when either circuit breaker opens, the second manually actuatable switch means being shiftable between an off position wherein it de-energizes the mower relay, a start position, wherein and alone allows the initial energization of the mower relay, and a run position wherein it causes the energization of the relay only when it is shifted from the start position, so that when the second circuit means is broken by either of the circuit breakers, the relay cannot be energized again until the second manually actuatable switch is shifted to its start position.

21. In a riding mower having a mobile main frame partly supported on a pair of drive wheels and including a mower means carried by the main frame, the combination therewith of an electric drive system for driving the mower unit and the drive wheels and comprising: a battery means carried by the main frame; a DC traction motor; means drivingly connecting the traction motor to the drive wheels; a DC mower motor means operative to drive the mower means; a main relay operative to connect the battery to the traction motor when energized; a first circuit means including the battery and a first manually actuatable switch means for controlling the energization of the main relay; a mower relay between the main relay and the mower motor means and operative to connect the battery to the mower motor means when the mower relay is energized; a second circuit means including the battery and a second manually actuatable switch means for controlling the energization of the mower relay; and a brake switch operatively associated with the mower relay so that it closes only when the relay is de-energized and connects the mower motor input to ground through a resistor means, to load the mower motor means when the mower relay is open and the mower motor means is functioning as a generator.

22. A tractor mower comprising:
a. a mobile frame carried at least partially by a drive wheel;
b. a rotary mower carried by said frame and suspended therefrom;
c. electrical drive circuitry including a drive motor having an output shaft connected to said drive wheel and further including a main switch adapted when energized to cause actuation of said drive motor for furnishing power to said drive wheel;
d. electrical mower circuitry including at least one mower motor operatively coupled to said mower and a mower switch for causing excitation of said mower motor; said mower circuitry being interconnected to said drive circuitry such that said mower motor can be excited only when said drive motor is activated.

23. In a tractor mower having a main frame carried at least in part by at least one drive wheel, mower means suspended from said frame, at least one electrical traction motor having an output shaft interconnected to said drive wheel for operatively driving the wheel when energized, at least one electrical mower motor having an output shaft interconnected to said mower means for operatively driving the mower means when energized, and an electrical energy source for supplying power to said traction and mower motors, an electrical control circuit for selectively electrically coupling said energy source to said mower and traction motors and comprising:
a. a first relay means adapted when energized to electrically couple said power source to said traction motor for energizing the motor;

b. a main switch manually shiftable into at least first and second position; said switch in said second position causing energization of said first relay means to cause activation of said traction motor and in said first position de-energizing said first relay means;

c. a second relay means adapted when energized to electrically couple said power source to said mower motor for energizing the mower motor; and d. a mower switch manually shiftable into at least first and second position; said mower switch being electrically interconnected to said main switch and said first and second relay means such that said second relay means is energized to cause activation of the mower motor to drive the mower means only when the first relay means is energized and the main switch and motor switch are simultaneously in their second positions.

24. A tractor mower as in claim 23 wherein said second relay means is further adapted when de-energized to load said mower motor to brake the output shaft thereof.

25. In a tractor mower having a mobile frame carried at least in part by a drive wheel, and mower cutting means suspended from said frame, the combination therewith of a control circuit for driving the drive wheel and the mower means comprising:

a. a DC electrical energy source having positive and negative terminals;

b. a traction drive motor having an output shaft interconnected to the drive wheel of said tractor-mower for driving same, said drive motor having first and second input leads, the first lead being electrically connected to the negative side of said DC energy source;

c. at least one DC mower motor having an output shaft interconnected to the mower means for driving same, said mower motor having first and second input leads, the first lead being electrically connected to the negative side of said energy source;

d. a main relay having a normally open contact and a coil, the first side of said coil being connected to the negative side of said DC energy source and the first side of said relay contact being electrically interconnected to the positive terminal of said energy source;

e. a mower relay having a normally open contact and a coil, the first side of said coil being electrically connected to the negative terminal of said energy source, the first side of the normally open contact being connected to the second side of the normally open contact of the main relay of the power source and the second side being connected to the second lead of the mower motor;

f. a main manually shiftable switch having three positions represented by "Start," "Off" and "Run" designations and further having five terminals, A, B, C, D and E, respectively, internally interconnected as follows:

In the "Off" position all of the terminals being electrically disconnected from each other;

In the "Start" position terminal A being electrically coupled to terminal B;

In the "Run" position terminal B being electrically coupled to terminal C and terminal D being electrically coupled to terminal E; and, externally connected as follows:

Terminal A being electrically connectible to the positive side of the DC power source;

Terminal B being electrically connectible to the second side of the main relay coil whereby in the "Start" position, electrical current flows from the power source through terminals A and B of the main switch to energize the main relay coil;

Terminal C being connected to the second side of the normally open contact of the main relay whereby in the "Run" position of the main switch, current flows through the relay contacts and terminals B and C of the main switch to maintain energization of the main relay;

Terminal D being connected to the second side of said mower relay coil;

g. A three-position mower switch represented by "Start," "Off," and "Run" designations having three terminals A, B, and C, internally interconnected as follows:

In the "Off" position, all of the terminals being electrically disconnected from each other;

In the "Start" position, terminal A being connected to terminal C; and

In the "Run" position, terminal A being connected to terminal B; and, externally connected as follows:

Terminal A being connected to terminal E of the main switch;

Terminal B being connected to the second side of the normally open mower relay contact; and Terminal C being connected to the second side of the normally open contacts of the main relay coil whereby when the main switch is in the "Run" position and the mower switch is in the "Start" position, current flows through terminals A and C of the mower switch and terminals E and D of the main switch to energize the mower relay and through the closure of the normally open contacts of the mower relay, the mower motor is energized to drive the mower means and whereby shifting either the main switch or the mower switch into the "Off" position de-energizes the mower relay which, in turn, drops out the mower motor.

26. A tractor mower as in claim 25 wherein said mower relay includes normally closed contacts having one side connected to the negative terminal of the power source and the other side to the second lead of the mower motor whereby when the mower motor has been de-energized and by continuing to rotate, acts as a generator, the normally closed contact shunts the motor to brake the rotation of the motor shaft.

* * * * *